April 28, 1925.
J. BITMAN
1,535,565
EMERGENCY SUPPLY TANK FOR AUTOMOBILES
Filed March 28, 1924 2 Sheets-Sheet 1
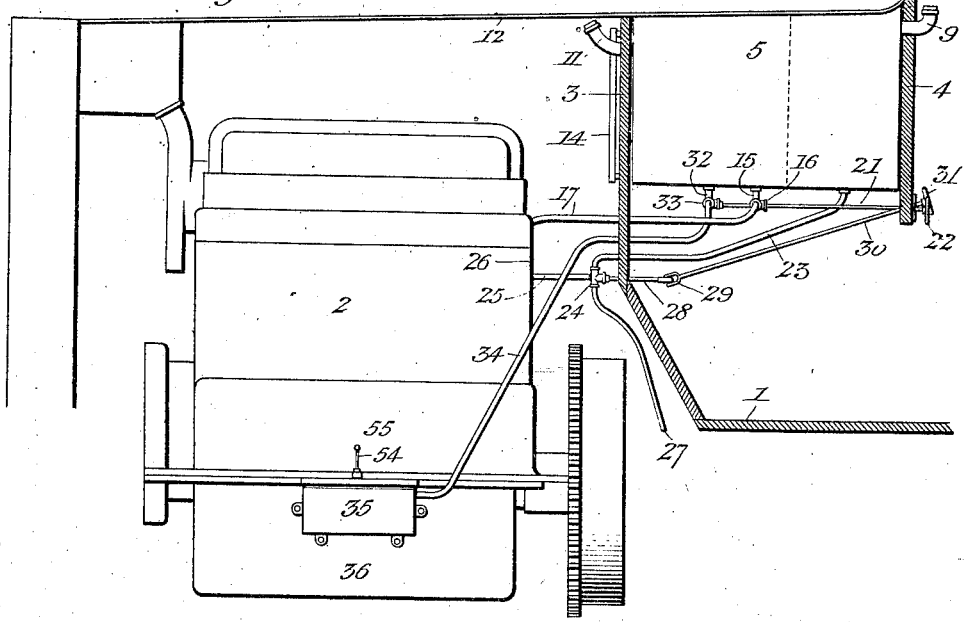
Fig. 1.
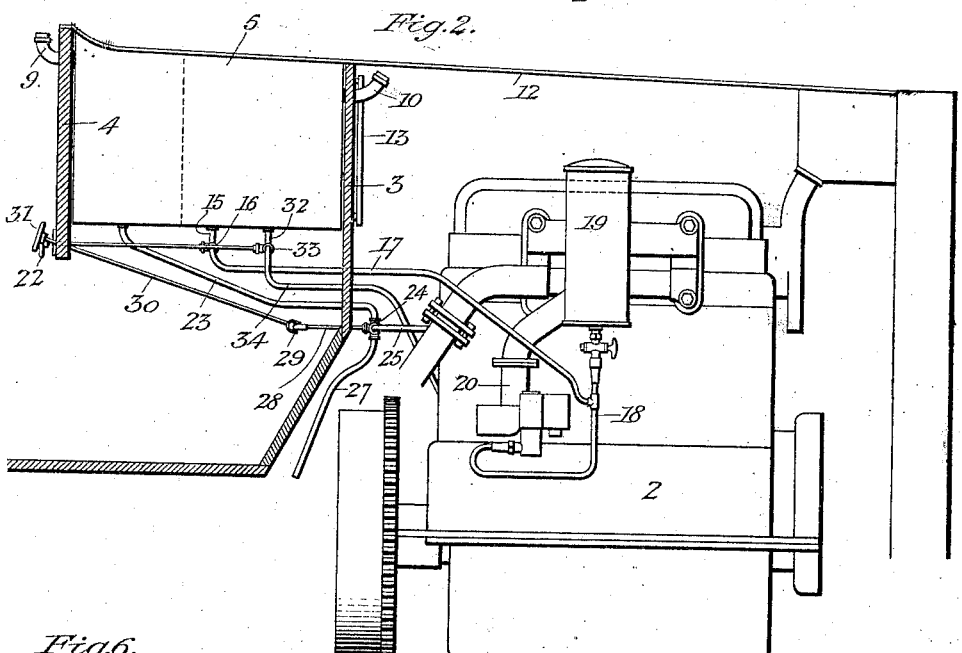
Fig. 2.
Fig. 6.
Inventor:
Joseph Bitman.
By H. S. Bailey, Attorney.

April 28, 1925.
J. BITMAN
1,535,565
EMERGENCY SUPPLY TANK FOR AUTOMOBILES
Filed March 28, 1924    2 Sheets-Sheet 2
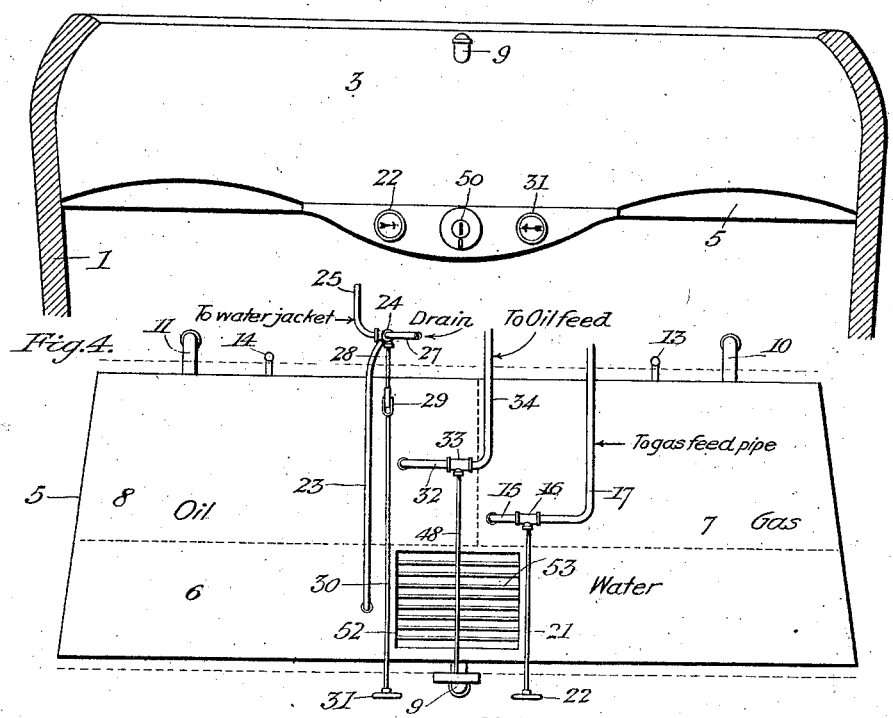
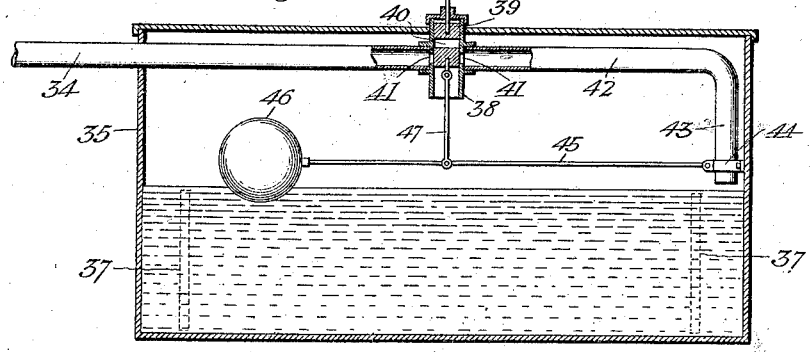
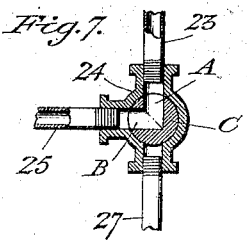
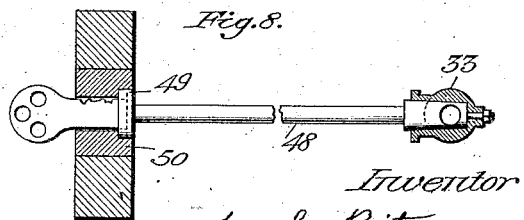
Inventor
Joseph Bitman.
By H. S. Bailey. Attorney Patented Apr. 28, 1925.

1,535,565

UNITED STATES PATENT OFFICE.

JOSEPH BITMAN, OF DENVER, COLORADO.

EMERGENCY SUPPLY TANK FOR AUTOMOBILES.

Application filed March 28, 1924. Serial No. 702,706.

*To all whom it may concern:*

Be it known that I, JOSEPH BITMAN, a citizen of Russia, residing at the city and county of Denver, and State of Colorado, have invented a new and useful Emergency Supply Tank for Automobiles, of which the following is a specification.

My invention relates to an emergency supply of oil, water and gasoline holding tank and its operating mechanism.

And the objects of my invention are:—

First: To provide a group of three separate but collectively united liquid-containing compartments in one tank, each of which is connected to its respective similar liquid-using part of the automobile engine by valve-controlled pipes, which are operated from the driver's seat to enable the driver of the car to admit instantly to the engine an additional supply of either oil, water or gasoline in case of an emergency, said compartments being provided with independent capped filling tubes.

I attain these objects by the mechanism illustrated and described in the accompanying drawings in which:—

Figure 1 is a longitudinal sectional view through the front end of an automobile, showing the engine, the emergency tank, and the valved pipes connecting the tank with the different parts of the engine.

Figure 2 is a view similar to Figure 1, but looking at the opposite side of the engine.

Figure 3 is a view looking at the instrument board of a car and showing the position of the hand-operated means for the valve operating rods.

Figure 4 is a bottom view of the improved emergency tank.

Figure 5 is a longitudinal sectional view through the oil feed tank which opens into the crank case.

Figure 6 is a top view of the emergency tank.

Figure 7 is a sectional view through the three-way valve which connects the water compartment of the tank with the water jacket of the engine, and, Figure 8 is a sectional view showing the manner in which the rod leading to the oil-controlling valve is operated by the key of the lighting and ignition switch.

Similar letters of reference refer to similar parts throughout the several views.

Referring to the accompanying drawings:—

The numeral 1 indicates the front end of an automobile, 2 the engine, 3 the dashboard, 4 the instrument board, and 5 the improved emergency tank which is supported between the dashboard and the instrument board.

The tank is divided into three compartments, namely, a water compartment 6, a gasoline compartment 7, and an oil compartment 8. The water compartment has a capped filling tube 9 which extends out through the instrument board, and the gasoline and oil compartments are provided with capped filling tubes 10 and 11 respectively, which extend out under the hood 12, and the gasoline and oil compartments are provided with gauges 13 and 14 respectively, which indicate the level of the liquid in the said compartments.

An outlet pipe 15 extends from the bottom of the gasoline compartment 7 and connects with one end of an ordinary two-way valve 16, and a pipe 17 extends from the other end of the valve 16, and connects with a pipe 18, which connects the usual vacuum tank 19 with the carburetor 20, as clearly shown in Figure 2.

A valve operating rod 21 extends from the valve 16 back through the instrument board 4, and is provided with a knob 22, by means of which the valve 16 can be operated to admit a supply of gasoline to the carburetor, through the pipes 17 and 18. An outlet pipe 23 extends from the bottom of the water compartment 6 to a three-way valve 24, which is preferably located between the engine and the dashboard. A pipe 25 extends from the valve 24 and connects with the water jacket 26 of the engine, and a drain pipe 27 extends in a downwardly direction from the other end of the said valve 24.

When the plug C of the valve 24 is turned so that its ports A and B register with the pipes 23 and 25, respectively—see Figure 7—water flows from the compartment 6 to the water jacket of the engine. When the plug C is turned so that its ports A and B register with the pipes 25 and 27, respectively, the water in the water jacket passes through the valve and out through the drain pipe 27; and when the plug is turned so that its part A registers with the solid wall of the valve casing, the valve cuts off the supply from the water compartment 6 to the water jacket, and also closes communication between the water jacket and the drain pipe 27.

An operating rod 28, extends from the plug C of the valve 24, through the dashboard and connects by means of a universal joint 29 with a rod 30, which extends up at an inclination through the instrument board and is provided with a knob 31.

A pipe 32 extends from the bottom of the oil compartment 8, and connects with one end of a valve 33, and a pipe 34 extends from the other end of this valve and passes through the upper portion of an oil feed reservoir 35, which is secured upon the side of the crank case 36, and the side of the reservoir adjoining the crank case is formed with vertical outlet slots 37, which permit oil to flow from the reservoir into the crank case. That part of the pipe 34 which passes through the reservoir connects with one side of a cut-off valve comprising a vertically disposed casing 38 and a slide valve 39 having a horizontal port 40, which is adapted, in one position of its movement, to register with ports 41 in the opposite sides of the casing 38, which ports 41 register with the pipe 34, and with a pipe 42 connected with the other side of the valve casing 38 in line with the pipe 34, and which has a downwardly bent end portion 43, which terminates at a point slightly above the normal oil lever in the reservoir.

A bracket 44 is secured to the inside of one end of the reservoir, and a rod 45 is hinged at one end to this bracket, and its other end is provided with a suitable float 46. A rod 47 is pivotally connected at one end to the lower end of the slide valve 39, and its other end is pivotally connected to the float supporting rod 45, so that the up and down movement of the rod 45 imparts a corresponding movement to the slide valve 39. The oil level in the reservoir is always the same as the oil level in the crank case, and when the crank is filled to its normal level, the float 46 lifts the rod 45 to a horizontal position, and the slide valve 39 is thereby lifted to the limit of its upward movement, in which position its port 40 is above the ports 41 of the valve case, and the solid lower end portion of the slide valve closes the said ports, so that the supply of oil from the oil compartment 8 to the reservoir is cut off, and no oil flows to the reservoir while valve 39 remains in this position. As soon, however, as the oil in the crank case drops below the normal level, the float rod 45 draws the slide valve 39 down, and when it reaches the point where its port 40 registers with the ports 41 in the valve casing 38, oil from the supply compartment 8 flows to the reservoir, and to the crank case, until the normal level is reached, when the supply is cut off, as previously described.

An operating rod 48 extends from the oil valve 33, and the opposite end of this rod has a slotted head 49, which fits in a corresponding recess in the ignition switch disk 50, so that when the switch key 51 is inserted in the switch to close the ignition circuit, the valve 33 is closed and the supply of oil to the reservoir is cut off. The oil can flow to the reservoir 35, only until the normal level is reached, when the supply is automatically cut off by float-actuated slide valve 39.

In order to cool the water in the compartment 6, I divide the said compartment into two parts by forming a vertical air passage 52 through the same midway of its length, and I connect two opposite walls of this air passage by tubes 53, which permit a circulation of the water through the two parts of the compartment; the tubes performing the same function as the usual tubes in the radiators of automobiles.

A rod 54 is connected to the upper end of the valve 39, and extends out through the upper end of the valve casing 38, and has a ball 55 on its upper end. This ball 55 acts as a gauge to indicate the depth of oil in the reservoir 35.

From the foregoing description, taken in connection with the drawings, it will be seen that the improved emergency tank can be installed without change in the present construction of automobiles; that means is thereby provided for furnishing an emergency supply of either gasoline or water, and that a normal supply of oil can always be maintained in the crank case; the controlling valve for the different compartments being within convenient reach of the driver of the car.

Having described my invention, what I claim as new and desire to secure by Letters Patent, is:

In a device of the character described, a water-jacketed engine having a carbureter and a crank case, said carbureter having a fuel inlet pipe; three compartments adapted to contain respectively a hydrocarbon fuel, water and oil; valved pipes connecting respectively the water compartment and water jacket, the fuel compartment and the carbureter inlet pipe; a reservoir communicating with said crank case, a pipe connecting the oil compartment and said reservoir, a valve in said pipe for opening or closing communication between the pipe and said reservoir, a float in said reservoir connected with said valve, whereby to automatically close the valve when the oil in the reservoir reaches the normal level, and a valve for controlling the outflow of oil from the oil compartment.

In testimony whereof I affix my signature in presence of two witnesses.

JOSEPH BITMAN.

Witnesses:
G. SARGENT ELLIOTT,
ELIZABETH SMITH.